(12) United States Patent
Nachenberg et al.

(10) Patent No.: US 7,568,229 B1
(45) Date of Patent: Jul. 28, 2009

(54) REAL-TIME TRAINING FOR A COMPUTER CODE INTRUSION DETECTION SYSTEM

(75) Inventors: Carey Nachenberg, Northridge, CA (US); Frank Barajas, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1052 days.

(21) Appl. No.: 10/612,198

(22) Filed: Jul. 1, 2003

(51) Int. Cl.
G06F 21/00 (2006.01)
G06F 17/30 (2006.01)

(52) U.S. Cl. .......................................... 726/23; 707/9
(58) Field of Classification Search ............. 726/22–25; 707/1, 9, 10; 709/225, 229
See application file for complete search history.

(56) References Cited

U.S. PATENT DOCUMENTS

| | | | |
|---|---|---|---|
| 4,959,849 A | 9/1990 | Bhusri | |
| 5,040,214 A * | 8/1991 | Grossberg et al. | 704/240 |
| 5,355,474 A | 10/1994 | Thuraisngham et al. | |
| 5,584,024 A | 12/1996 | Shwartz | |
| 5,664,172 A | 9/1997 | Antoshenkov | |
| 5,694,595 A * | 12/1997 | Jacobs et al. | 707/9 |
| 5,742,806 A | 4/1998 | Reiner et al. | |
| 5,768,422 A * | 6/1998 | Yaeger | 382/228 |
| 5,826,076 A | 10/1998 | Bradley et al. | |
| 5,961,582 A * | 10/1999 | Gaines | 718/1 |
| 6,128,740 A | 10/2000 | Curry et al. | |
| 6,282,546 B1 * | 8/2001 | Gleichauf et al. | 707/102 |
| 6,311,278 B1 | 10/2001 | Raanan et al. | |
| 6,314,409 B2 | 11/2001 | Schneck et al. | |
| 6,321,337 B1 * | 11/2001 | Reshef et al. | 726/14 |
| 6,356,887 B1 | 3/2002 | Berenson et al. | |
| 6,584,569 B2 | 6/2003 | Reshef et al. | |
| 6,598,038 B1 | 7/2003 | Guay et al. | |
| 6,775,657 B1 * | 8/2004 | Baker | 706/45 |
| 6,775,827 B1 * | 8/2004 | Harkins | 717/130 |
| 6,839,850 B1 * | 1/2005 | Campbell et al. | 726/23 |
| 6,851,113 B2 * | 2/2005 | Hemsath | 718/104 |
| 7,047,369 B1 * | 5/2006 | Gruper et al. | 711/152 |
| 7,050,936 B2 * | 5/2006 | Levy et al. | 702/181 |
| 7,085,780 B2 | 8/2006 | Sakamoto et al. | |
| 7,085,928 B1 | 8/2006 | Schmid et al. | |
| 7,120,645 B2 | 10/2006 | Manikutty et al. | |
| 7,120,933 B2 | 10/2006 | Mattsson | |
| 7,185,232 B1 | 2/2007 | Leavy et al. | |
| 7,237,265 B2 | 6/2007 | Reshef et al. | |

(Continued)

OTHER PUBLICATIONS

Chung, Christina Yip, Gertz, Michael, and Levitt, Karl; *DEMIDS: A Misuse Detection System for Database Systems*; Department of Computer Science, University of California at Davis; Oct. 1, 1999; pp. 1-18.

(Continued)

*Primary Examiner*—Emmanuel L Moise
*Assistant Examiner*—Zachary A Davis
(74) *Attorney, Agent, or Firm*—Fenwick & West LLP

(57) ABSTRACT

Systems, methods, and computer-readable media for training a computer code intrusion detection system in real time. A method embodiment of the present invention comprises the steps of observing (22), in real time, commands (5) that are accessing the computer code (1); and deriving (23) from said commands (5), in real time, a set (6) of acceptable commands.

19 Claims, 2 Drawing Sheets

U.S. PATENT DOCUMENTS

| | | | |
|---|---|---|---|
| 7,240,201 B2 * | 7/2007 | Neufeld et al. | 713/168 |
| 7,296,274 B2 * | 11/2007 | Cohen et al. | 719/315 |
| 2002/0065896 A1 | 5/2002 | Burakoff et al. | |
| 2002/0083343 A1 | 6/2002 | Crosbie et al. | |
| 2002/0157020 A1 | 10/2002 | Royer | |
| 2003/0037251 A1 * | 2/2003 | Frieder et al. | 713/200 |
| 2003/0069880 A1 | 4/2003 | Harrison et al. | |
| 2003/0101355 A1 | 5/2003 | Mattsson | |
| 2003/0133554 A1 | 7/2003 | Nykanen et al. | |
| 2003/0145226 A1 * | 7/2003 | Bruton et al. | 713/201 |
| 2003/0154402 A1 * | 8/2003 | Pandit et al. | 713/201 |
| 2003/0167229 A1 | 9/2003 | Ludwig et al. | |
| 2003/0188189 A1 * | 10/2003 | Desai et al. | 713/201 |
| 2003/0204719 A1 | 10/2003 | Ben-Itzhak | |
| 2003/0221123 A1 * | 11/2003 | Beavers | 713/201 |
| 2003/0233583 A1 * | 12/2003 | Carley | 713/201 |
| 2004/0098617 A1 | 5/2004 | Sekar | |
| 2004/0098623 A1 * | 5/2004 | Scheidell | 713/201 |
| 2004/0193656 A1 | 9/2004 | Pizzo et al. | |
| 2004/0199535 A1 | 10/2004 | Zuk | |
| 2004/0199647 A1 * | 10/2004 | Ramarao et al. | 709/229 |
| 2004/0205360 A1 * | 10/2004 | Norton et al. | 713/201 |
| 2004/0220915 A1 | 11/2004 | Kline et al. | |
| 2004/0250127 A1 | 12/2004 | Scoredos et al. | |
| 2004/0250134 A1 * | 12/2004 | Kohler et al. | 713/201 |
| 2004/0260945 A1 * | 12/2004 | Raikar et al. | 713/201 |
| 2005/0086529 A1 | 4/2005 | Buchsbaum | |
| 2005/0097149 A1 | 5/2005 | Vaizblit et al. | |
| 2005/0138006 A1 | 6/2005 | Bennett et al. | |
| 2005/0138426 A1 | 6/2005 | Styslinger | |
| 2005/0154733 A1 | 7/2005 | Meltzer et al. | |
| 2005/0203886 A1 | 9/2005 | Wong | |
| 2005/0203921 A1 | 9/2005 | Newman et al. | |
| 2005/0273859 A1 | 12/2005 | Chess et al. | |
| 2005/0289187 A1 | 12/2005 | Wong et al. | |
| 2006/0070128 A1 | 3/2006 | Heimerdinger et al. | |
| 2006/0117386 A1 * | 6/2006 | Gupta et al. | 726/23 |
| 2006/0212438 A1 | 9/2006 | Ng | |
| 2006/0212941 A1 | 9/2006 | Bronnikov et al. | |
| 2006/0242136 A1 | 10/2006 | Hammond et al. | |
| 2007/0074188 A1 | 3/2007 | Huang et al. | |
| 2007/0094728 A1 | 4/2007 | Julisch et al. | |
| 2007/0169194 A1 | 7/2007 | Church et al. | |

OTHER PUBLICATIONS

Lee, Sin Yeung, Low, Wai Lup, and Wong, Pei Yuen; Learning Fingerprints For A Database Intrusion Detection System; Computer Security Laboratory; DSO National Laboratories, Singapore; Nov. 2002; pp. 264-279.

Low, Wai Lup, et al, "DIDAFIT: Detecting Intrusions In Databases Through Fingerprinting Transactions," ICEIS 2002, Fourth International Conference On Enterprise Information Systems, vol. 1, Apr. 3-6, 2002, pp. 121-128, Ciudad Real, Spain.

Johnson R., Protecting Your Data and Your Microsoft SQL Server, Entercept Security Technologies, pp. 1-12 [online], Oct. 2, 2002, [retrieved on Jan. 30, 2004]. Retrieved from the Internet: <URL: http://networkassociates.com/us/tier2/products/media/mcalee/wp-sq/protection.pdf>.

Krügel, C. et al., "A Survey On Intrusion Detection Systems," Distributed Systems Group, Technical University Of Vienna, Dec. 12, 2000, pp. 1-36.

Ramasubramanian, P. et al., "Quickprop Neural Network Ensemble Forecasting Framework For A Database Intrusion Prediction System," Neural Information Processing—Letters and Reviews, Oct. 2004, pp. 9-16, vol. 5, No. 1.

Solutions by Tech Target, Entercept Database Edition, Nov. 2002, [retrieved on Jan. 9, 2004]. Retreved from the Internet: <URL: http://infosecuritymag.techtarget.com/2002/nov/solutions.shtml>.

Valeur, F. et al, "A Learning-Based Approach To The Detection Of SQL Attacks," Proceedings of the Conference on Detection of Intrusions and Malware & Vulnerability Assessment (DIMVA), Vienna, Austria, Jul. 2005, 18 pages.

Halfond, W.G.J. et al., "Combining Static Analysis and Runtime Monitoring to Counter SQL-Injection Attacks," Workshop on Dynamic Analysis, (WODA 2005), May 17, 2005, St. Louis, MO, USA.

Kruegel, C. et al., "Anomaly Detection of Web-Based Attacks," CCS'03, Oct. 27-31, 2003, pp. 251-261.

Oracle, Understanding Query Expressions ("Oracle 8 ConText Cartridge Application Developer's Guide, Release 2.3"), 1997, [online] Retrieved from the Internet<URL:http://download-est.oracle.com/docs/cd/A58617_01/cartridg.804/a58164/ch03.htm>.

Pfleeger, C.P., "Security in Computing," 1996, pp. 426-433, $2^{nd}$ Edition.

Archive of "Postgre SQL 7.1 Documentation," www.postgresql.org, [online] [Archived by http://archive.org on Jun. 6, 2001; Retrieved in May 2001] Retrieved from the Internet<URL:http://web.archive.org/web/2001060601127/www.postresql.org/idocs/idnex.php?overv...>.

Weisstein, E.W., "The CRC Concise Encyclopedia of Mathematics," 1998, p. 1726.

\* cited by examiner

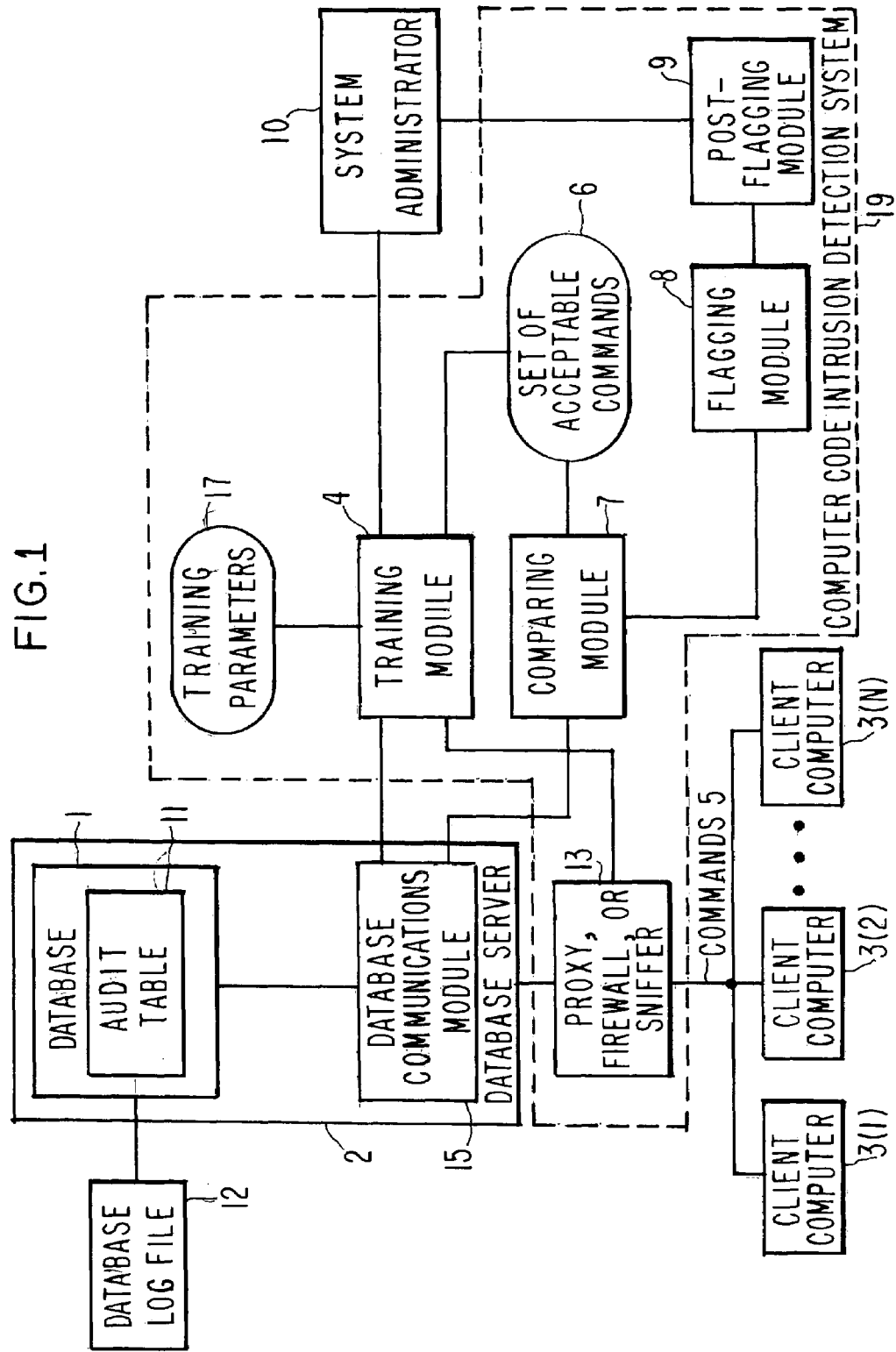

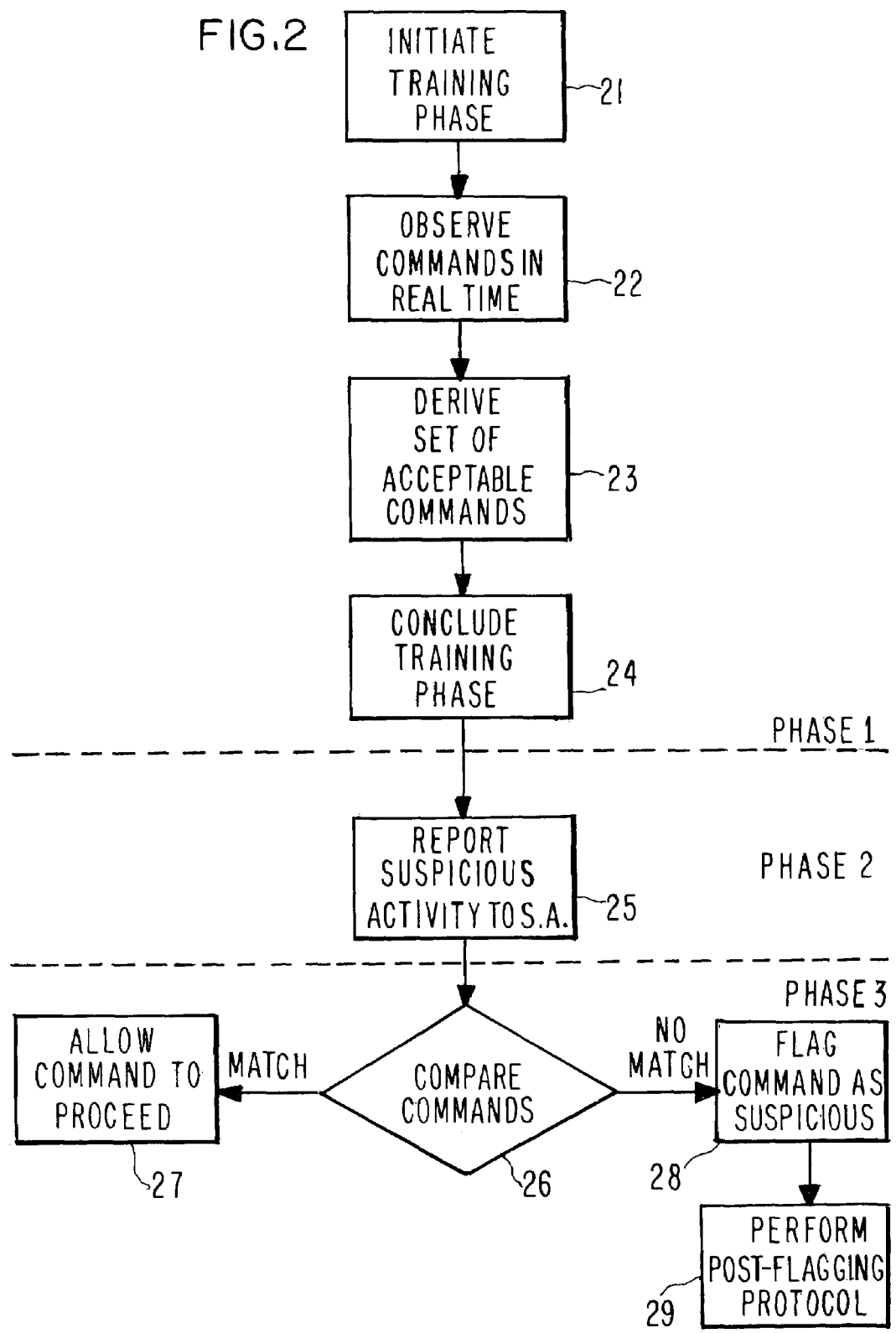

REAL-TIME TRAINING FOR A COMPUTER CODE INTRUSION DETECTION SYSTEM

TECHNICAL FIELD

This invention pertains to the field of thwarting intrusions perpetrated by malicious attackers to computer code (e.g., databases).

BACKGROUND ART

The background art includes systems where the computer code being attacked is a database. Such systems are called database intrusion detection systems. Some of these systems utilize offline non-real-time training in order to detect suspicious or anomalous activity. These systems use database log files external to the database, or audit tables internal to the database, in conjunction with the training. Since these database intrusion detection systems are trained during normal usage of the database, the amount of logged data may be extensive—potentially many gigabytes in size over the course of the training. Requiring the system administrator to collect multiple gigabytes of logged data to train the system is expensive in terms of storage needs, and requires constant monitoring by the system administrator to ensure that the logged entries do not fill up the storage area of the computer used for the training. In addition, many database systems override older logged entries when the number of entries exceeds a pre-allocated storage limit. This causes entries to be overwritten and thus lost before training can occur. Furthermore, if the audit logs are stored within the database itself (to be used later during an operational step), such storage uses up valuable resources on the database and negatively impacts the database's performance.

Examples of offline non-real-time database intrusion detection systems are described in Lee, et al., "Learning Fingerprints for a Database Intrusion Detection System", *ESORICS* 2002, pp. 264-279, published in November 2002 by Springer-Verlag, Berlin and Heidelberg, Germany; and C. Chung, et al., "DEMIDS: A Misuse Detection System for Database Systems", Department of Computer Science, University of California at Davis, Davis, Calif., Oct. 1, 1999.

DISCLOSURE OF INVENTION

The present invention comprises systems, methods, and computer-readable media for training a computer code intrusion detection system in real time. A method embodiment of the present invention comprises the steps of observing (22), in real time, commands (5) that are accessing the computer code (1); and deriving (23) from said commands (5), in real time, a set (6) of acceptable commands.

BRIEF DESCRIPTION OF THE DRAWINGS

These and other more detailed and specific objects and features of the present invention are more fully disclosed in the following specification, reference being had to the accompanying drawings, in which:

FIG. 1 is a block diagram illustrating embodiments of the present invention.

FIG. 2 is a flow diagram illustrating method embodiments of the present invention.

DETAILED DESCRIPTION OF THE PREFERRED EMBODIMENTS

This invention has applicability to any code intrusion detection system, i.e., any system in which computer code 1 is susceptible to being attacked by commands 5 which may be malicious, due to malicious intent on the part of the user 3 who issues the command 5. As used herein, "user" can refer to a client computer 3 and/or to a human who has control of computer 3. As illustrated in FIG. 1, there can be a plurality N of users 3, where N is any positive integer.

Most of the following description illustrates the special case where the computer code 1 is a database 1. Database 1 can be any type of database, such as a relational database or a flat file. When database 1 is a relational database, commands 5 are typically written in a SQL language. As used herein, "SQL" is taken in the broad sense to mean the original language known as SQL (Structured Query Language), any derivative thereof, or any structured query language used for accessing a relational database. In the case where computer code 1 is not a relational database, the commands can be written in another language such as XML. Database 1 may have associated therewith an internal audit table 11 and/or an external database log file 12 for storing audit and/or ancillary information pertaining to database 1. Database 1 is typically packaged within a dedicated computer known as a database server 2, which may also contain database communications module 15 and other modules not illustrated. Modules 1, 11, 12, 15, 13, 17, 4, 7, 6, 8, and 9 can be implemented in software, firmware, hardware, or any combination thereof, and are typically implemented in software.

Computer code intrusion detection system 19 (and its special case, database intrusion detection system 19) encompasses modules 17, 4, 13, 7, 6, 8, and 9. FIG. 1 illustrates the case where these modules are stand-alone modules separate from database server 2. However, they could just as well be incorporated within database server 2, e.g., they could be incorporated within database communications module 15. Thus, intrusion detection system 19 could be published by a third party as a standalone package on any type of computer-readable medium, or bundled by the manufacturer of the database 1 with module 15. The purpose of intrusion detection system 19 is to protect computer code 1 from users 3 that have nefarious intent. For example, such users may desire to steal credit card information from database 1, modify database 1 to credit their account with additional money, modify database 1 to spread a computer worm, etc.

With respect to FIG. 2, it can be seen that intrusion detection system 19 operates in three phases. Phase one is a training phase and encompasses steps 21 through 24. Phase two is an optional reporting phase and encompasses step 25. Phase 3 is an operational phase and encompasses steps 26 through 29.

In order for intrusion detection system 19 to be used, it must be first trained. The training phase is initiated at step 21. This is done by system administrator 10 flipping a switch (which may be located, for example, on database server 2 or on training module 4); by means of a preselected event occurring (e.g., the first of each month or the addition of a new table within database 1); or by any other means known to one of ordinary skill in the art for starting a software or other computer system.

At step 22, training module 4 observes, in real time, commands 5 that users 3 send to database 1. As used herein, "real time" means "during a short time interval surrounding an event". Thus, observing a command 5 in real time means that the command 5 is observed during a short time interval surrounding the instant that the command 5 enters the database 1.

Examples of commands 5 include querying the database 1, adding an entry to the database 1, deleting an entry from the database 1, and modifying an entry in the database 1. There are two major ways in which the observing step 22 is performed: real-time auditing and in-line interception.

Real-time auditing is typically used in cases where database 1 has an auditing feature. The auditing information may be placed into an audit table 11 internal to database 1 or into an external database log file 12. In real-time auditing, training module 4 instructs the database 1 to generate a new event every time a command enters database 1. Each event can include such items as the text of the command 5, a date/time stamp, information on the user that issues the command 5, the IP (Internet Protocol) address of the issuing computer 3, the application that issued the command 5, etc.

The event data can appear in string or binary form, and can be extracted using a number of different techniques, depending on the implementation of the IDS 19, including APIs (Application Programming Interfaces) that access the computer code 1. One example is to use ODBC (Open DataBase Connectivity), a set of C language API's that allows one to examine or modify data within database 1. If the JAVA programming language is used, JDBC (JAVA DataBase Connectivity) can be used instead. Another way of extracting the needed information from database 1 is to use code injection or patching to inject logic into one or more modules 1,15 within database server 2, to transfer control to training module 4. In another embodiment, called "direct database integration", the database 1 vendor, who has access to the commands 5 in conjunction with the normal operation of the database 1, makes the commands 5 available to intrusion detection system 19. In yet another embodiment, in cases where database 1 supports it, external database log file 12 may be examined without the need to resort to special software. Once an event has been processed by the IDS 19, it can optionally be expunged from any table or log file it is stored in, to make room for subsequent events.

In in-line interception, at least one of a proxy, firewall, or sniffer 13 is interposed between database 1 and users 3. The proxy, firewall, or sniffer 13 examines packets of information emanating from users 3 and extracts the relevant information therefrom. Proxy, firewall, or sniffer 13 may need to decrypt the communications emanating from users 3 if these communications are encrypted.

After a command 5 has been captured in step 22, at step 23 training module 4 analyzes the command 5 and updates a set 6 of acceptable commands, again in real time. In other words, set 6 is updated command-by-command. In one embodiment, the deriving step 23 comprises grouping the commands 5 into categories and updating statistical information pertaining to the categories, all in real time. The categories are pre-selected, and can be fed to training module 4 via prestored but modifiable training parameters 17. The categories can include one or more of the following: canonicalized commands; the dates and times at which the commands access the computer code 1; logins (user IDs, passwords, catch phrases, etc.) of users 3 issuing the commands 5; the identities of users 3 issuing the commands 5; the departments of the enterprise in which the users 3 work, or other groups to which the users 3 belong; the applications (i.e., software programs or types of software programs) that issue the commands 5; the IP addresses of the issuing computers 3; frequency of issuing a given command 5 by a given user 3; identities of users 3 accessing a given field or fields within the computer code 1; the times of day that a given user or group of users 3 accesses a given field or fields within the computer code 1; the fields or combination of fields being accessed by given commands 5; tables or combinations of tables within the computer code 1 accessed by the commands.

The invention will now be further described with respect to the special case in which the commands 5 are grouped into categories comprising canonicalized commands. A canonicalized command is a command 5 stripped of its literal field data. Thus, for example, let us assume that the command 5 is:

SELECT NAME FROM PATIENTS WHERE NAME LIKE 'FRANK' AND AGE >25

Literal field data is defined as a specific value of a parameter. In this case, the literal field data is "FRANK" and "25". Thus, a canonicalized form of the command 5 is:

SELECT NAME FROM PATIENTS WHERE NAME LIKE * AND AGE > *

Literal fields can include literal numbers (plain numbers), dates, times, strings, and potentially named ordinal values (symbolic words used to represent numbers, e.g., "January" represents the first month, "Finance" represents department 54, etc.). Training module 4 uses the canonicalized command as an index to group and categorize the commands 5. Even in a large database 1, the number of command categories is usually less than 20,000 or so.

To continue with our example, the following commands 5 would all be placed into the same command category:

SELECT NAME FROM PATIENTS WHERE NAME LIKE 'FRANK' AND AGE >25

SELECT NAME FROM PATIENTS WHERE NAME LIKE 'BILL' AND AGE >40

SELECT NAME FROM PATIENTS WHERE NAME LIKE 'ED' AND AGE >25

In one embodiment, the command

SELECT NAME FROM PATIENTS WHERE NAME IS 'FRANK' AND AGE >25 would be treated differently from the command SELECT NAME FROM PATIENTS WHERE NAME LIKE 'FRANK' AND AGE >25. In an alternative embodiment, a list of synonyms is kept, so that "IS" is treated the same as "LIKE", and thus these two commands are treated as falling within the same command category.

In the last example, instead of using "ED", one could use "ED %" where % is a wildcard character. (Other wildcard characters might include #, ?, or _, depending upon the language variant used.) Thus, "ED %" would pick up "EDWARD", "EDDIE", and "EDWINA", as well as "ED". Wildcards are tracked by field and by command category, to give information needed to determine whether the use of the wildcard is innocuous or suspicious (see the following discussion with respect to step 25).

The fact that a wildcard is not observed in a given field during the training phase can be saved in the set 6 of acceptable commands, along with canonicalized data as described above. Then, during the operational phase, the presence of a wildcard character in that field is flagged as being suspicious.

For a given command 5, training module 4 examines the value of each literal field and determines whether its value is in the set of values seen thus far for that field, or whether it constitutes a new value. Continuing with our example based upon the three commands 5 given above, training module 4 stores the following information in NAME and AGE fields associated with the given canonicalized command category:

CANONICALIZED COMMAND CATEGORY:
SELECT NAME FROM PATIENTS WHERE NAME LIKE * AND AGE > *
NAME statistics:
Total number of different field values: 3 (Frank, Bill, and Ed)

Generalize flag: FALSE (Do not generalize)
Wildcard flag: TRUE (wildcards have been used in this field, e.g. "ED")
AGE statistics:
Total number of different field values: 2 (25, 40)
Generalize flag: FALSE (Do not generalize)
Wildcard flag: FALSE (wildcards have not been used in this field)

Notice from the above that the actual names are stored because there aren't too many. Alternatively, all names having fewer than a preselected number of characters could be stored.

In one embodiment, whenever, for a given literal field, the number of observed values is greater than or equal to a preselected threshold value S, the training module 4 sets a flag for this field in this canonicalized command category, indicating that the field should be generalized, allowing any legitimate value. Thus, for example, if S=4 and training module 4 observes a fourth query:

SELECT NAME FROM PATIENTS WHERE NAME LIKE 'STEVE' AND AGE >25, training module 4 determines that it has already seen three distinct values (Frank, Bill, and Ed) in the NAME field, and it has just been presented with Steve. This now pushes the number of distinct cases for the NAME field to four, which meets or exceeds the preselected threshold. In this case, training module 4 automatically sets the generalize flag for this field in this command category, indicating that any value is acceptable. The entry then changes to:

CANONICALIZED COMMAND CATEGORY:
SELECT NAME FROM PATIENTS WHERE NAME LIKE * AND AGE > *
NAME statistics:
Total number of different field values: 4 or more (no actual field data saved)
Generalize flag: TRUE (Allow any valid string for this field)
Wildcard flag: TRUE (wildcards have been used in this field, e.g. "ED")
AGE statistics:
Total number of different field values: 2 (25, 40)
Generalize flag: FALSE (Do not generalize)
Wildcard flag: FALSE (wildcards have not been used in this field)

This technique may be advantageously used when there are a constrained number of values for that field. For example, if the field represents the month of the year, there are a maximum number of 31 days in any month, so S should be set to 31.

Similarly, if the field represents the year, there are a maximum of 12 months in any year, so S should be set equal to 12. Once a given field within a given canonicalized command category has been generalized, there is no need to save all observed valued for this field anymore. Thus, the code intrusion detection system 19 uses less memory as more items are generalized.

In addition to the field attributes "generalize" and "wildcard", other attributes e.g., "length of string", can be used. The "generalize" attribute can be a partial or conditional "generalize", e.g., any name is allowed in the NAME field as long as it contains fewer than a preselected number of characters.

The training phase is ended, at step 24, by any one of a number of means. For example, system administrator 10 can flip a switch on database server 2 or training module 4. Alternatively, the training phase may end by a statistical technique, e.g., training module 4 monitors the occurrence or frequency of new canonicalized command categories being established or new fields being established, and determines that a preselected frequency threshold has been met. As with all of the preselected parameters, the preselected frequency threshold may be stored in training parameters 17. Alternatively, the training phase may end by the occurrence of a preselected elapsed or absolute time, or by any other means known to one of ordinary skill in the art.

At the conclusion of the training phase, the set 6 of acceptable commands that has been gradually built up in real time during the training phase becomes used as the basis for comparison during the subsequent operational phase (phase 3 in FIG. 2). Based upon the above example, the set 6 of acceptable commands contains the following two commands:

SELECT NAME FROM PATIENTS WHERE NAME LIKE * AND AGE >25
SELECT NAME FROM PATIENTS WHERE NAME LIKE * AND AGE >40

In the above, * means that the field can hold any valid string value. These two commands in set 6 represent all valid SQL commands 5 observed during the training phase. This real-time system 4 has now built up a table of canonicalized commands, determined which fields in these commands should be generalized, and has done this using a limited amount of memory. Even with 20,000 commands 5, only megabytes of storage are needed. This is in contrast to the off-line non-real-time systems of the prior art where logs 11, 12 may grow to gigabytes in length. For example, in the present invention, if the following command 5 was issued 5 million times:

SELECT NAME FROM PATIENTS WHERE NAME LIKE somename AND AGE >25 it would require less than a kilobyte to represent this command data. On the other hand, off-line non-real-time training systems of the prior art would have to keep a full audit log 11, 12 of all 5 million occurrences as input to the off-line training process.

Returning to FIG. 2, optional step 25 is invoked. When step 25 is used, suspicious activity is tracked during the training phase. For example, the number or percentage of times a wildcard character is used for a particular field for a particular command category can be tracked. If this number or percentage exceeds a preselected threshold (again, provided by parameters 17), the activity is deemed to be suspicious. This suspicious activity can then be reported to the system administrator 10. A wildcard may be either innocuous or suspicious, based upon where it is used. For example, if a wildcard is used in a NAME OF AUTHOR field in a database 1 of library books, that is probably innocuous. On the other hand, if a wildcard is used in the PASSWORD field in a database 1 of credit card information, that most likely would be deemed suspicious. The system administrator can then selectively remove from the set 6 of acceptable commands such suspicious commands 5.

After the training phase and the optional suspicious activity reporting phase have been completed, the intrusion detection system 19 operates in the operational phase. At step 26, commands 5 that are currently accessing database 1 are compared by comparing module 7 against commands in the set 6 of acceptable commands. Module 7 can extract the current commands 5 in the same manner as described above for training module 4. The current command 5 is pre-processed similarly to the way the corresponding command 5 was pre-processed in the training phase, if this is needed to facilitate the comparison. For example, in the illustration described above, the command 5 is first canonicalized.

The basic rule by which module 7 operates is that if the current command 5 matches a command in the set 6 of acceptable commands, comparing module 7 allows the current command 5 to access database 1 (at step 27). If, on the other hand, the current command 5 does not match a command 5 in the set 6 of acceptable commands, comparing module 7 flags the current command 5 as being suspicious (at step 28). Then a post-flagging protocol is performed at step 29. This protocol entails execution of at least one of the following steps: an alert is sent to the system administrator 10; the command 5 is not allowed to access the computer code 1; the command 5 is allowed to access the computer code 1, but the access is limited in some way (for example, the amount of data sent back to user 3 is limited, or wildcard characters are removed from certain fields); the command 5 is augmented, e.g., investigational code is inserted into the command 5 to provoke an audit trail; the user 3 sending the command 5 is investigated. Such an investigation can be performed by computer means (e.g., sending out a digital trace to determine the identity of the user 3) and/or by off-line means (sending a human private investigator to spy on user 3).

It will be seen from the above discussion that the present invention may offer, inter alia, the following advantages over prior art systems:

It may reduce by several orders of magnitude the amount of data required to perform training of an intrusion detection system.

It eliminates the need for the system administrator 10 to collect, manage, and delete large log files.

It eliminates problems associated with overwritten log entries, ensuring that the training never misses any legitimate training data.

It improves the performance of the database 1 by eliminating the storage of audit log data within built-in audit table 11.

It eliminates the need for the system administrator 10 to manually configure database 1 to perform audit logging.

It is an "on line" system, i.e., it doesn't disrupt the normal operations of the database 1.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer-implemented method for training a database intrusion detection system in real time, said method comprising the steps of:
    observing, in real time, commands that are accessing the database during a training phase;
    establishing categories responsive to the observed commands;
    grouping the commands into the categories;
    performing a statistical analysis of the categories, the analysis comprising determining whether a predetermined threshold number of categories has been exceeded;
    deriving from said commands, in real time, a set of acceptable commands; and
    ending the training phase responsive to a determination that the predetermined threshold number of categories has been exceeded.

2. The method of claim 1 wherein the commands are SQL commands.

3. The method of claim 1 wherein at least one observed command is selected from the group of commands consisting of a query, an add, a delete, and a modify.

4. The method of claim 1 wherein the categories comprise at least one category selected from the group of categories consisting of:
    canonicalized commands;
    dates and times at which commands access the computer code;
    logins of users that issue commands;
    identities of users that issue commands;
    departments of users that issue commands;
    applications that issue commands;
    IP addresses of issuing users;
    frequency of issuing commands by users;
    identities of users accessing a given field within the database;
    times of day that a given user accesses a given field within the database;
    fields accessed by commands;
    combinations of fields accessed by commands;
    tables within the database accessed by commands; and
    combinations of tables within the database accessed by commands.

5. The method of claim 1 wherein:
    the categories comprise canonicalized commands; and
    each category is a command stripped of literal field data.

6. The method of claim 1 wherein the observing step comprises at least one of:
    real-time auditing; and
    in-line interception.

7. The method of claim 6 wherein the observing step comprises real-time auditing; and at least one of the following is used to extract the commands for observation:
    an API that accesses the database;
    code injection;
    patching; and
    direct database integration.

8. The method of claim 6 wherein the observing step comprises in-line interception; and at least one of the following is interposed between senders of the commands and the database:
    a proxy;
    a firewall; and
    a sniffer.

9. The method of claim 1 wherein:
    during the deriving step, a suspicious activity is tracked; and
    subsequent to the deriving step, the suspicious activity is reported to a system administrator.

10. The method of claim 1 further comprising, subsequent to the deriving step, an operational phase in which commands that are accessing the database are compared against the set of acceptable commands.

11. The method of claim 10 wherein a command that is accessing the database during the operational phase that does not match a command in the set of acceptable commands is flagged as suspicious.

12. The method of claim 11 wherein, when a command is flagged as suspicious, at least one of the following is performed:
    an alert is sent to a system administrator;
    the command is not allowed to access the database;
    the command is allowed to access the database, but the access is limited;

the command is augmented;

a sender of the command is investigated.

13. The method of claim 1, wherein:

the statistical analysis further determines whether a predetermined frequency threshold for establishing the categories has been exceeded; and the training phase ends responsive to a determination that the predetermined frequency threshold has been exceeded.

14. The method of claim 1, further comprising:

determining whether a predetermined period of time for the training phase has elapsed; and ending the training phase responsive to a determination that the predetermined period of time has elapsed.

15. A computer-readable storage medium containing computer program instructions for training a database intrusion detection system in real time, said computer program instructions performing the steps of:

observing, in real time, commands that are accessing the database during a training phase;

establishing categories responsive to the observed commands;

grouping the commands into the categories;

performing a statistical analysis of the categories, the analysis comprising determining whether a predetermined threshold number of categories has been exceeded;

deriving from said commands, in real time, a set of acceptable commands; and ending the training phase responsive to a determination that the predetermined threshold number of categories has been exceeded.

16. The computer-readable storage medium of claim 15 wherein:

the categories comprise canonicalized commands; and each category is a command stripped of literal field data.

17. The computer-readable storage medium of claim 16 further comprising, subsequent to the deriving step, an operational phase in which commands that are accessing the database are compared against the set of acceptable commands.

18. A computer-readable storage medium storing computer executable program code for training a database intrusion detection system in real time, the computer-executable code comprising:

a training module adapted for observing, in real time, commands that are accessing the database during a training phase, establishing categories responsive to the observed commands, grouping the commands into the categories, performing a statistical analysis of the categories to determine whether a predetermined threshold number of categories has been exceeded, deriving from the commands, in real time, a set of acceptable commands, and ending the training phase responsive to a determination that the predetermined threshold number has been exceeded; and coupled to the set of acceptable commands, a comparison module for comparing the commands that access the database during an operational phase with the commands in the set of acceptable commands.

19. The computer-readable storage medium of claim 18, wherein:

the statistical analysis further determines whether a predetermined frequency threshold for establishing the categories has been exceeded; and the training phase ends responsive to a determination that the predetermined frequency threshold has been exceeded.

* * * * *